US012024404B2

(12) United States Patent
Babu

(10) Patent No.: US 12,024,404 B2
(45) Date of Patent: Jul. 2, 2024

(54) GUIDE RAIL-PILLAR SYSTEM OF PNEUMATIC VACUUM ELEVATOR AND A METHOD TO OPERATE THE SAME

(71) Applicant: Killakathu Ramanathan Babu, Tamilnadu (IN)

(72) Inventor: Killakathu Ramanathan Babu, Tamilnadu (IN)

(73) Assignee: KILLALATHU RAMANATHAN BABU (IN)

( * ) Notice: Subject to any disclaimer, the term of this patent is extended or adjusted under 35 U.S.C. 154(b) by 0 days.

(21) Appl. No.: 17/928,629

(22) PCT Filed: Sep. 10, 2020

(86) PCT No.: PCT/IB2020/058417

§ 371 (c)(1),
(2) Date: Nov. 30, 2022

(87) PCT Pub. No.: WO2021/245455

PCT Pub. Date: Dec. 9, 2021

(65) Prior Publication Data

US 2023/0202800 A1 Jun. 29, 2023

(30) Foreign Application Priority Data

Jun. 2, 2020 (IN) ............................ 202041023074

(51) Int. Cl.
*B66B 7/02* (2006.01)
*B66B 9/04* (2006.01)
*B66B 11/00* (2006.01)

(52) U.S. Cl.
CPC ................ *B66B 7/022* (2013.01); *B66B 9/04* (2013.01); *B66B 11/0005* (2013.01)

(58) Field of Classification Search
CPC ........ B66B 7/022; B66B 9/04; B66B 11/0005
See application file for complete search history.

(56) References Cited

U.S. PATENT DOCUMENTS 5,583,326 A 12/1996 Sors
11,802,021 B2 * 10/2023 Babu ........................ B66B 7/026

FOREIGN PATENT DOCUMENTS

CN 103863918 A * 6/2014
CN 104787645 B 6/2018

(Continued)

OTHER PUBLICATIONS

WO-2015033363-A1 English translation.*
KR-101160644-B1 English translation.*
CN-103863918-A English translation.*

*Primary Examiner* — Minh Truong
(74) *Attorney, Agent, or Firm* — Jason C. Cameron

(57) ABSTRACT

A guide rail-pillar system is disclosed. The system includes at least one guide rail pillar to guide an actuation of a cabin of a pneumatic vacuum elevator, wherein the at least one guide rail pillar is disposed at an external cylinder assembly. The at least one guide rail pillar includes a first surface. A curved structure is extruded from a first surface of the at least one guide rail pillar, wherein the curved structure enables movement of the cabin in a vertical direction. The at least one guide rail pillar includes at least two grooves disposed on lateral sides. The at least two grooves accommodates a covering sheet for enclosing the external cylinder assembly. The at least one guide rail pillar includes at least three ribs. The at least three ribs connects the at least one guide rail pillar with a base ring and the external cylinder assembly.

7 Claims, 6 Drawing Sheets

(56) References Cited

FOREIGN PATENT DOCUMENTS

| | | | | | |
|---|---|---|---|---|---|
| EP | 3498650 | A2 | | 11/2020 | |
| KR | 101160644 | B1 | * | 6/2012 | |
| KR | 20180073037 | A | | 7/2018 | |
| WO | WO-2015033363 | A1 | * | 3/2015 | ......... B66B 11/0005 |
| WO | WO-2021245455 | A1 | * | 12/2021 | ............. B66B 7/022 |
| WO | WO-2022175730 | A1 | * | 8/2022 | ............... B66B 9/04 |
| WO | WO-2023021322 | A1 | * | 2/2023 | ............. B66B 7/022 |

* cited by examiner

GUIDE RAIL-PILLAR SYSTEM OF PNEUMATIC VACUUM ELEVATOR AND A METHOD TO OPERATE THE SAME

CROSS-REFERENCE TO RELATED APPLICATION

This Application claims priority from a Patent application filed in India having Patent Application No. 202041023074, filed on Jun. 2, 2020, and titled "A GUIDE RAIL-PILLAR SYSTEM OF PNEUMATIC VACUUM ELEVATOR AND A METHOD TO OPERATE THE SAME" and a PCT Application No. PCT/M2020/058417 filed on Sep. 10, 2020, and titled "A GUIDE RAIL-PILLAR SYSTEM OF PNEUMATIC VACUUM ELEVATOR AND A METHOD TO OPERATE THE SAME".

BACKGROUND

Embodiments of the present disclosure relate to a pneumatic vacuum elevator and more particularly, to a system that stabilize and guide support of cabin movement with the pneumatic elevator.

Pneumatic vacuum elevators are typically used in countervailing weights in order to facilitate a cabin moving up and down between various layers or floors at various heights inside the vertical passageways of office buildings, hospitals, factories and similar structures. The pneumatic vacuum elevators use air pressure to cause the motion of the cabin within a thoroughfare or tubular cylinder that uses the air within it as a working fluid upon the confines of the cabin. Transmission of the pneumatic vacuum elevators are supported and guided by a mechanical device such as a guide rail. Generally, the guide rail is a part of an inner working mechanism of most of the pneumatic vacuum elevators and lift shafts. The guide rail is fixed on two sides of the shaft, wherein the one side of the guide rail guides the pneumatic vacuum elevator and the other side for the counterweight. In tandem, the guide rail operates both as stabilization within the shaft during routine use and as a safety system in case of emergency stops. Various types of guide rails are available which enables smooth ride of the cabin inside the vertical passageways.

Conventionally, the guide rail available in market for transmission of the cabin of the pneumatic vacuum elevator includes one or more wheels coupled to the cabin for ascending and descending motion of the elevator. However, such conventional system with the one or more wheels causes vibration which creates anxiety for the users. Furthermore, such conventional guide rail mechanism generates friction and noise during up and down motion of the pneumatic vacuum elevator.

Hence, there is a need for an improved guide rail-pillar system of pneumatic vacuum elevator and a method to operate the same in order to address the aforementioned issues.

BRIEF DESCRIPTION

In accordance with one embodiment of a present disclosure, a guide rail-pillar system is disclosed. The system includes at least one guide rail pillar to guide an actuation of a cabin of a pneumatic vacuum elevator, wherein the at least one guide rail pillar is disposed at an external cylinder assembly. The at least one guide rail pillar includes a first surface. A curved structure is extruded from a first surface of the at least one guide rail pillar, wherein the curved structure enables movement of the cabin in a vertical direction. The at least one guide rail pillar includes at least two grooves disposed on lateral sides. The at least two grooves accommodates a covering sheet for enclosing the external cylinder assembly. The at least one guide rail pillar includes at least three ribs. The at least three ribs connects the at least one guide rail pillar with a base ring and the external cylinder assembly.

In accordance with another embodiment of the present disclosure, a pneumatic vacuum elevator with a guide rail pillar system is disclosed. The pneumatic vacuum elevator includes a cabin to carry a passenger for transiting across one or more floors of a building. The pneumatic vacuum elevator includes a guide rail pillar system which includes at least one guide rail pillar disposed at an external cylinder assembly. The at least one guide rail pillar guides an actuation of the cabin of the pneumatic vacuum elevator. The at least one guide rail pillar also includes a curved structure extruded from a first surface of the at least one guide rail pillar, wherein the curved structure enables movement of the cabin in a vertical direction. The at least one guide rail pillar also includes at least two grooves disposed on lateral sides. The at least two grooves accommodates a covering sheet for enclosing the external cylinder assembly. The at least one guide rail pillar includes at least three ribs. The at least three ribs connects the at least one guide rail pillar with a base ring and the external cylinder assembly.

In accordance with yet another embodiment of the present disclosure, a method for providing actuation of a cabin by a guide rail pillar system of a pneumatic vacuum elevator is disclosed. The method includes providing at least one guide rail pillar for guiding an actuation of a cabin of the pneumatic vacuum elevator, wherein the at least one guide rail pillar is disposed at an external cylinder assembly. The method also includes extruding a curved structure from a first surface of the at least one guide rail pillar for enabling movement of the cabin in a vertical direction. The method also includes forming at least two grooves disposed on lateral sides of the at least one guide rail pillar to accommodate a covering sheet for enclosing the external cylinder assembly. The method also includes disposing at least three ribs located on a second surface of the at least one guide rail pillar to connect the at least one guide rail pillar with a base ring and the external cylinder assembly.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figures 1, 1B:
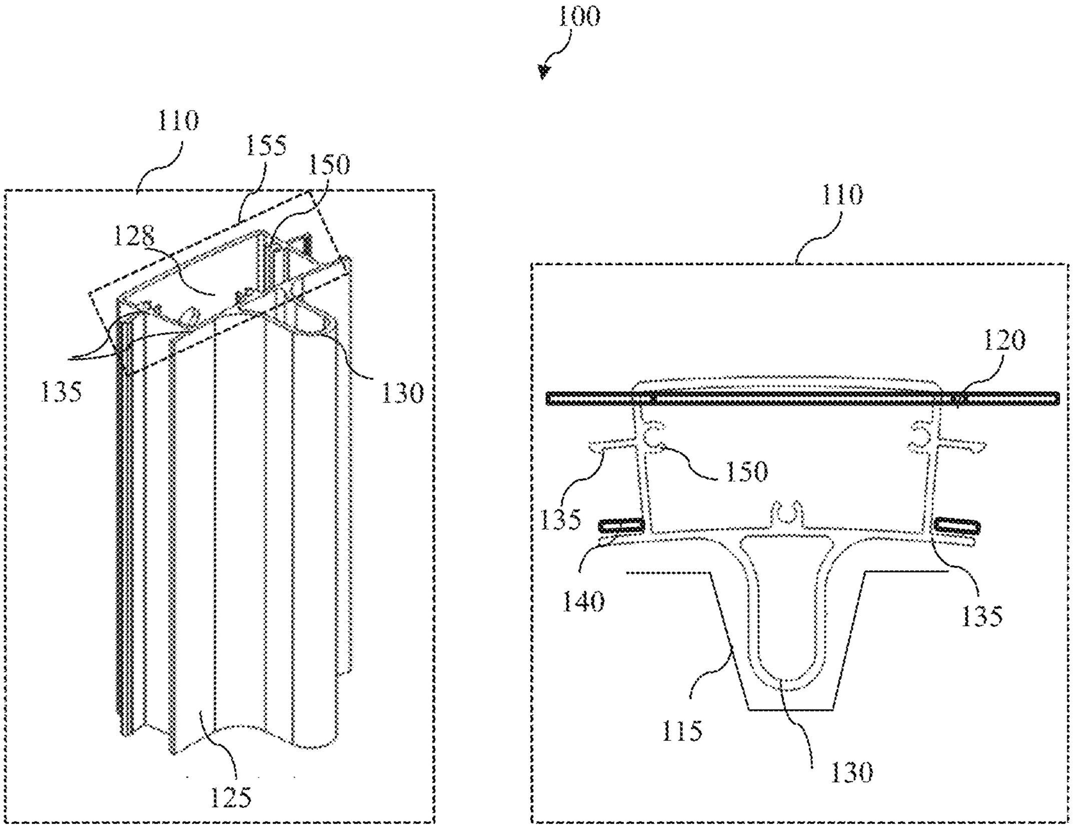
FIG. 1 is a schematic representation of a guide rail-pillar system in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an" and "the" include plural references unless the context clearly dictates otherwise.

Embodiments of the present disclosure relate to a guide rail pillar system. The system includes at least one guide rail pillar to guide an actuation of a cabin of a pneumatic vacuum elevator, wherein the at least one guide rail pillar is disposed at an external cylinder assembly. The at least one guide rail pillar includes a first surface, A curved structure is extruded from a first surface of the at least one guide rail pillar, wherein the curved structure enables movement of the cabin in a vertical direction. The at least one guide rail pillar includes at least two grooves disposed on lateral sides. The at least two grooves accommodates a covering sheet for enclosing the external cylinder assembly. The at least one guide rail pillar includes at least three ribs. The at least three ribs connects the at least one guide rail pillar with a base ring and the external cylinder assembly.

FIG. 1 is a schematic representation of a guide rail-pillar system 100 in accordance with an embodiment of the present disclosure, FIG. 1(*a*) illustrates a schematic representation of a profile section view of an embodiment of at least one guide rail pillar 110 of the guide rail-system 100 of FIG. 1. Similarly, FIG. 1(*b*) illustrates a schematic representation of an isometric view of an embodiment of the at least one guide rail pillar 110 of the guide rail-system 100 of FIG. 1. The system 100 includes the at least one guide rail pillar 110 to guide an actuation of a cabin 115 of a pneumatic vacuum elevator, wherein the at least one guide rail pillar 110 is disposed at an external cylinder assembly. In one embodiment, the at least one guide rail pillar 110 may be manufactured from aluminium metal. The external cylinder assembly has the at least one guide rail pillar 110 that is used for smooth ride of the cabin 115 from inside and the at least one guide rail pillar 110 is connected with a top surface and a bottom surface of a base ring 120.

The at least one guide rail pillar 110 includes a first surface 125. A curved structure 130 is extruded from the first surface 125 of the at least one guide rail pillar 110, wherein the curved structure 130 enables movement of the cabin 115 in a vertical direction. In one embodiment, the first surface 125 may include an internal surface of the at least one guide rail pillar 110. In such embodiment, the at least one guide rail pillar 110 may include a hollow tunnel 128 coupled to the first surface 125. The at least one guide rail pillar 110 is placed at one or more sides of the external cylinder assembly at an evenly spaced intervals.

The at least one guide rail pillar 110 includes at least two grooves 135 disposed on lateral sides. The at least two grooves 135 accommodates a covering sheet 140 for enclosing the external cylinder assembly. The at least two grooves 135 also grasps a rubber block 138 in between the covering sheet 140 to lock an air gap. In one embodiment, the covering sheet 140 may include a polycarbonate sheet for providing visibility in one or more directions from inside of the cabin 115. The at least two grooves 135 accommodates the covering sheet 140 between the at least one guide rail pillar 110 which is placed on four sides of external cylinder for 360-degree visibility from inside of the cabin 115 of the pneumatic vacuum elevator while in riding condition. In such embodiment, the at least one guide rail pillar 110 may include two guide rail pillars.

The at least one guide rail pillar 110 includes at least three ribs 150 located at a second surface 155. In one embodiment, the second surface 155 may include a top surface of the at least one gamete rail pillar 110. The at least three ribs 150 positioned on the top surface of the at least one guide rail pillar 110 is used for connecting the base ring 120, top and bottom for external cylinder assembly (not shown in FIG. 1). In one embodiment, the at least three ribs 150 may include at least three semi-circular ribs. The at least three ribs 150 are positioned on a periphery of the top surface 155 of the at least one guide rail pillar 110 for firmly holding the base ring 120, and the external cylinder assembly. The at least three semi-circular ribs 150 are formed by rectangular pipes of the top surface of the at least one guide rail pillar 110 bent in a semi-circular shape.

Figure 2:
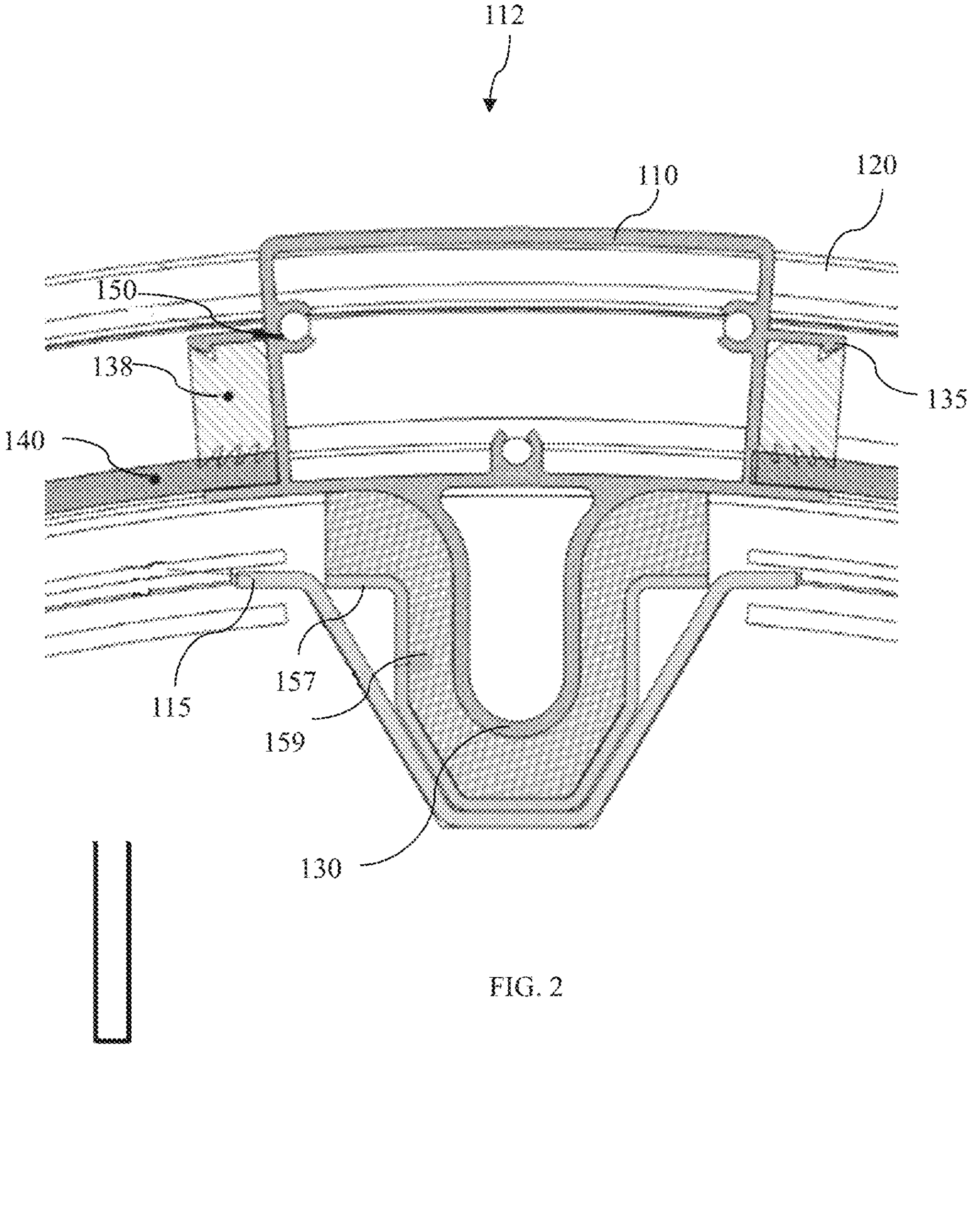
FIG. 2 depicts a schematic representation of a cross section view of an embodiment of at least one guide rail pillar with a cabin and the external cylinder assembly in accordance with an embodiment of the present disclosure.

FIG. 2 depicts a schematic representation of a cross section view of an embodiment 112 of at least one guide rail pillar 110 with a cabin 115 and the external cylinder assembly. The at least one guide rail pillar 110 also includes a guide bracket 157. The guide bracket 157 is welded with frame of the at least one guide rail pillar 110 along with a carpet 159 to avoid vibration of the cabin 115 during movement and enables smooth travelling. In one embodiment, the guide bracket 157 maybe welded with the frame of the at least one guide rail pillar 110 along with a cloth, a nylon, or any material to reduce the friction that enables smooth movement.

Figure 3:
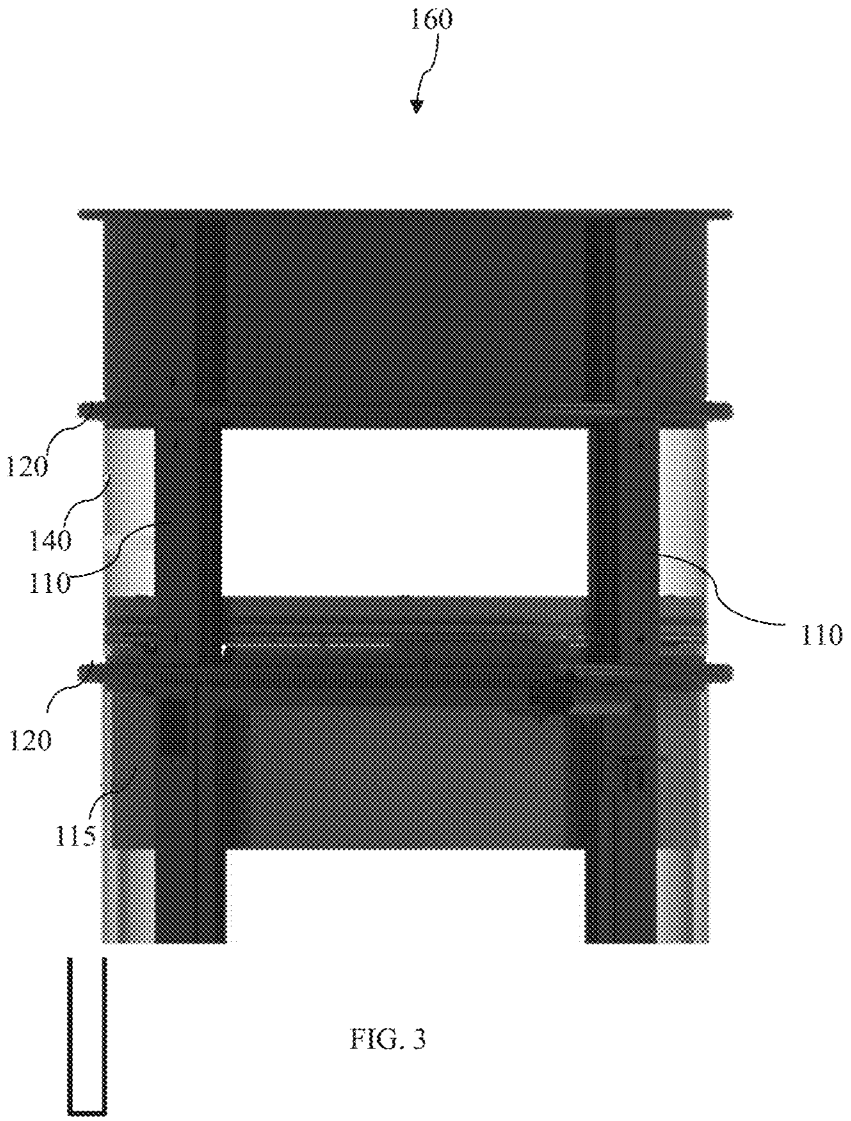
FIG. 3 illustrates a schematic representation of an embodiment of a pneumatic vacuum elevator with an assembled orientation view of guide rail pillar system of FIG. 1 in accordance with an embodiment of the present disclosure.

FIG. 3 illustrates a schematic representation of an embodiment 160 of a pneumatic vacuum elevator with an assembled orientation view of the guide rail pillar system of FIG. 1 in accordance with an embodiment of the present disclosure. The pneumatic vacuum elevator 160 includes a cabin 115 to carry a passenger for transiting across one or more floors of a building. The cabin 115 used herein is substantially similar to the cabin 115 used in the guide pillar system of FIG. 1. In one embodiment, the cabin 115 may include an enclosed vacuum chamber for transiting in vertical direction across the one or more floors of the building. In such embodiment, the cabin may include an electromechanical door for letting the passenger in and out.

The pneumatic vacuum elevator 160 includes a guide rail pillar system 100 which includes at least one guide rail pillar disposed at an external cylinder assembly. The guide rail pillar system 100 is substantially similar to a guide rail pillar system of FIG. 1. The guide rail pillar system 100 includes at least one guide rail pillar 110. The at least one guide rail pillar 110 guides an actuation of the cabin 115 of the pneumatic vacuum elevator 160. The at least one guide rail pillar 110 also includes a curved structure (not shown in FIG. 2) extruded from a first surface of the at least one guide rail pillar 110, wherein the curved structure enables movement of the cabin in a vertical direction. The at least one guide rail pillar 110 also includes at least two grooves disposed on lateral sides. The at least two grooves accommodates a covering sheet 140 for enclosing the external cylinder assembly. In one embodiment, the covering sheet may include a polycarbonate sheet 140 for covering the external cylinder assembly. The at least one guide rail pillar includes at least three ribs. The at least three ribs connects the at least one guide rail pillar 110 with a base ring 120 and the external cylinder assembly.

Figure 4:
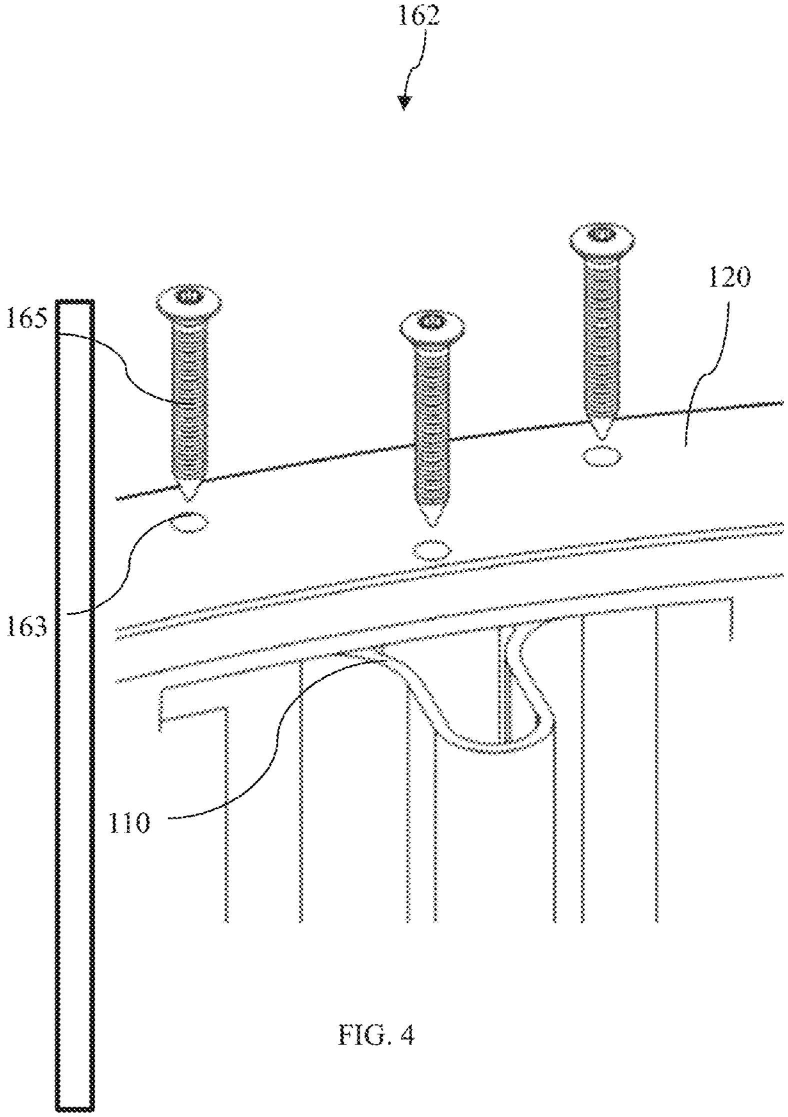
FIG. 4 illustrates a schematic representation of an embodiment of the at least one guide rail pillar of external cylinder assembly coupled with the base ring used in the pneumatic vacuum elevator in accordance with an embodiment of the present disclosure.

FIG. 4 illustrates a schematic representation of an embodiment 162 of the at least one guide rail pillar of external cylinder assembly coupled with the base ring used in the pneumatic vacuum elevator in accordance with an embodiment of the present disclosure. The base ring 120 includes at least three holes 163 which enables fixing of the at least one guide rail pillar 110 in a proper aligned position by using three self-drilling screw 165. The connection of the at least one guide rail pillar 110 with the base ring 120 and the external cylinder assembly through the three semi-circular ribs improves functioning of the guide rail in guiding movement of the cabin.

Figure 5:
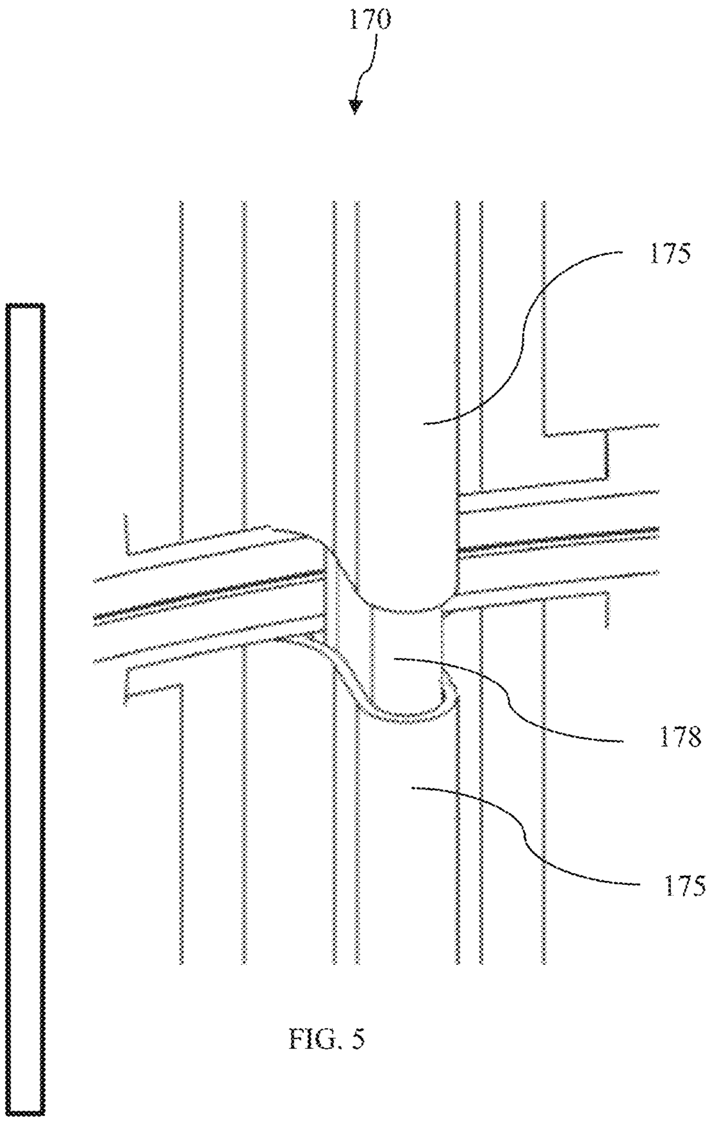
FIG. 5 illustrates a schematic representation of another embodiment of a cylinder connecting rod coupled between external cylinder assemblies of a pneumatic vacuum elevator in accordance with an embodiment of the present disclosure.

FIG. 5 illustrates a schematic representation of another embodiment 170 of a cylinder connecting rod coupled between external cylinder assemblies of a pneumatic vacuum elevator in accordance with an embodiment of the present disclosure. The pneumatic vacuum elevator also includes one or more external cylinder assemblies. A cylinder 175 of the external cylinder assembly gets connected with another cylinder of another external cylinder assembly through a cylinder connecting rod 178. The cylinder connecting rod 178 is utilized to connect between two cylinders 175 of the external cylinder assemblies for rigidity of the pneumatic vacuum elevator.

Figure 6:
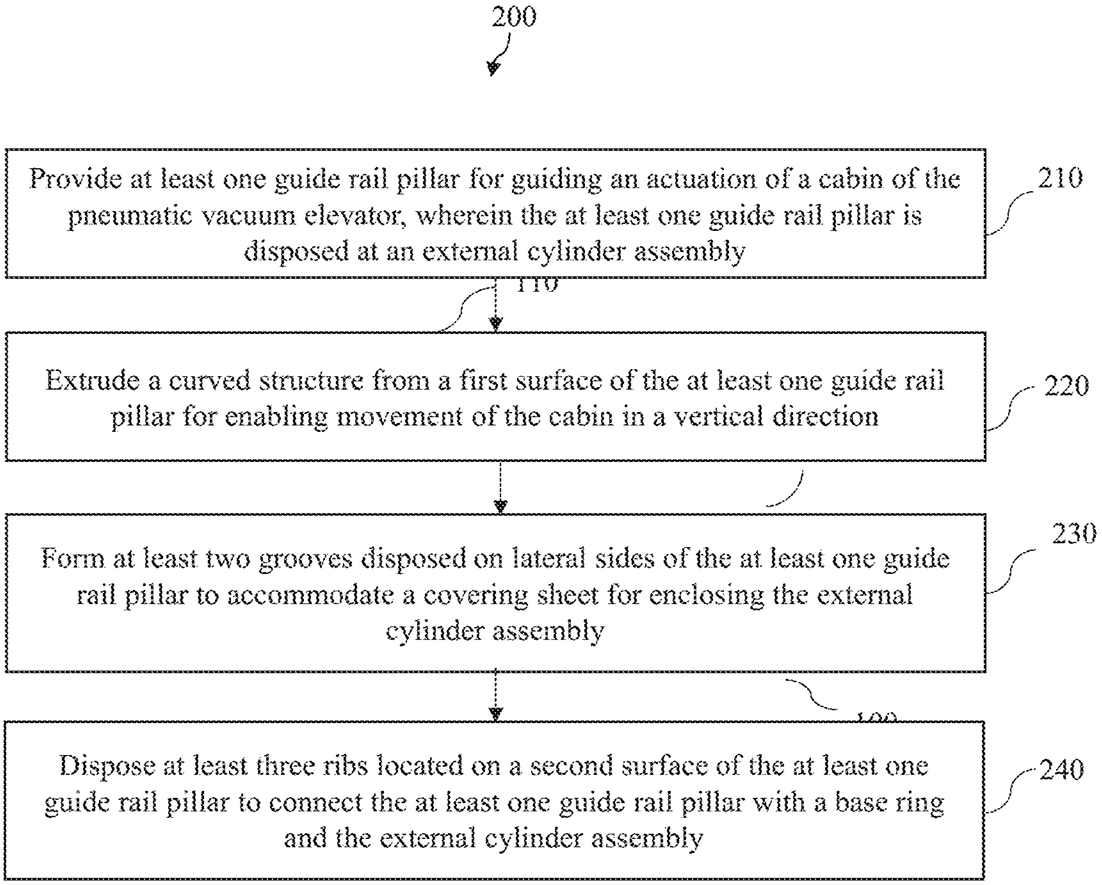
FIG. 6 is a flow chart representing the steps involved in a method for operation of a guide rail pillar system of a pneumatic vacuum elevator of FIG. 1 in accordance with the embodiment of the present disclosure.

FIG. 6 is a flow chart representing the steps involved in a method 200 for operation of a guide rail pillar system of a pneumatic vacuum elevator of FIG. 1 in accordance with the embodiment of the present disclosure. The method 200 includes providing at least one guide rail pillar for guiding an actuation of a cabin of the pneumatic vacuum elevator, wherein the at least one guide rail pillar is disposed at an external cylinder assembly in step 210. In one embodiment, providing the at least one guide rail pillar for guiding the actuation of the cabin pneumatic vacuum elevator may include providing the at least one guide rail pillar disposed at the external cylinder assembly for enabling smooth ride of the cabin from inside, wherein the at least one guide rail pillar is connected with a top surface and a bottom surface of a base ring. In such embodiment, providing the at least one guide rail pillar may include providing the at least one guide rail pillar manufactured from aluminium metal.

The method 200 also includes extruding a curved structure from a first surface of the at least one guide rail pillar for enabling movement of the cabin in a vertical direction in step 220. In one embodiment, extruding the curved structure from the first surface of the at least one guide rail pillar may include extruding the curved structure from an internal surface of the at least one guide rail pillar, wherein the curved structure is protruded in an outward direction. In such embodiment, the at least one guide rail pillar with the curved structure is placed at one or more sides of the external cylinder assembly at an evenly spaced intervals.

The method 200 also includes forming at least two grooves disposed on lateral sides of the at least one guide rail pillar to accommodate a covering sheet for enclosing the external cylinder assembly in step 230. In one embodiment, forming the at least two grooves on the lateral sides of the at least one guide rail pillar may include providing the at least two grooves disposed on the lateral sides of the at least one guide rail pillar in parallel to each other. In a specific embodiment, forming the at least two grooves disposed on the lateral sides of the at least one guide rail pillar to accommodate the covering sheet may including forming the at least two grooves to accommodate a polycarbonate sheet.

The method 200 also includes disposing at least three ribs located on a second surface of the at least one guide rail pillar to connect the at least one guide rail pillar with a base ring and the external cylinder assembly in step 240. In one embodiment, disposing the at least three ribs located on the second surface of the at least one guide rail pillar may include providing at least three semi-circular ribs located on the second surface of the at least one guide rail pillar. In such embodiment, the second surface may include a top surface of the at least one guide rail pillar. In one embodiment, the at least three ribs positioned on the top surface of the at least one guide rail pillar is used for connecting the base ring, top and bottom for external cylinder assembly.

Various embodiments of the present disclosure relate to a guide rail system which includes at least one guide rail pillar which includes at least three ribs for connecting the base ring and the external cylinder assembly and requires minimal handling process while installation and loading or unloading process.

Also, the at least three ribs of the at least one guide rail pillar connects the base ring and provides more strength and rigidity to shaft of the pneumatic vacuum elevator.

Moreover, the present disclosed system guides support of the cabin movement in upper & lower side without causing friction and thus reduces anxiety of the passenger within the elevator.

In addition, the at least two grooves grasp the covering sheet for enclosing the external cylinder assembly, wherein the covering sheet enables 360-degree visibility from inside of cabin while riding condition.

Furthermore, the curved structure enables vertical movement of the cabin in a smooth manner. Also, the hole inside the curved structure holds a cylinder connecting rod which connects the two cylinders for providing rigidity to the pneumatic vacuum elevator.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A guide rail pillar system (100) comprising:

at least one guide rail pillar (110) configured to guide an actuation of a cabin (115) of a pneumatic vacuum elevator, wherein the at least one guide rail pillar (110) is disposed at an external cylinder assembly, wherein the at least one guide rail pillar (110) comprises:

a curved structure (130) extruded from a first surface (125) of the at least one guide rail pillar (110), wherein the curved structure is configured to enable movement of the cabin (115) in a vertical direction;

at least two grooves (135) disposed on lateral sides of the at least one guide rail pillar (110), wherein the at least two grooves (135) are configured to accommodate a covering sheet (140) for enclosing the external cylinder assembly, wherein the at least two grooves (134) grasp a rubber block (138) in between the covering sheet (140) to lock an air gap; and at least three ribs (150) located on a second surface (128) of the at least one guide rail pillar (110), wherein the at least three ribs (150) are configured to connect the at least one guide rail pillar (110) with a base ring (120) and the external cylinder assembly, wherein the at least one guide rail pillar (110) comprises a guide bracket (157) to reduce the friction that enables smooth movement of the cabin (115).

2. The system (100) as claimed in claim 1, wherein the at least one guide rail pillar (110) comprises a hollow tunnel coupled to the first surface (125) of the at least one guide rail pillar (110).

3. The system (100) as claimed in claim 1, wherein the at least one guide rail pillar (110) is placed at one or more sides of the external cylinder assembly at evenly spaced intervals.

4. The system (100) as claimed in claim 1, wherein the covering sheet (140) comprises a polycarbonate sheet for providing visibility in one or more directions from inside of the cabin (115).

5. The system (100) as claimed in claim 1, wherein the at least three ribs (150) comprises at least three semi-circular ribs.

6. A pneumatic vacuum elevator (160) with a guide rail pillar system comprising:

a cabin (115) configured to carry a passenger for transiting across one or more floors of a building;

the guide rail pillar system (100) mechanically coupled to the cabin (115), wherein the guide rail pillar system (100) comprises at least one guide rail pillar (110) disposed at an external cylinder assembly, wherein the at least one guide rail pillar (110) is configured to guide an actuation of the cabin (115) of the pneumatic vacuum elevator (300), wherein the at least one guide rail pillar (115) comprises:

a curved structure (130) extruded from a first surface (125) of the at least one guide rail pillar (110), wherein the curved structure (130) is configured to enable movement of the cabin (115) in a vertical direction;

at least two grooves (135) disposed on lateral sides of the at least one guide rail pillar (110), wherein the at least two grooves (135) are configured to accommodate a covering sheet (140) for enclosing the external cylinder assembly, wherein the at least two grooves (134) grasp a rubber block (138) in between the covering sheet (140) to lock an air gap; and at least three ribs (150) located on a second surface (155) of the at least one guide rail pillar (110), wherein the at least three ribs (150) are configured to connect the at least one guide rail pillar (110) with a base ring (120) and the external cylinder assembly-, wherein the at least one guide rail pillar (110) comprises a guide bracket (157) to reduce the friction that enables smooth movement.

7. A method (200) for providing an actuation of a cabin by a guide rail pillar system of a pneumatic vacuum elevator comprising:

providing at least one guide rail pillar for guiding the actuation of the cabin of the pneumatic vacuum elevator, wherein the at least one guide rail pillar is disposed at an external cylinder assembly (210);

extruding a curved structure from a first surface of the at least one guide rail pillar for enabling movement of the cabin in a vertical direction (220);

forming at least two grooves disposed on lateral sides of the at least one guide rail pillar to accommodate a covering sheet for enclosing the external cylinder assembly (230), wherein the at least two grooves (134) grasp a rubber block (138) in between the covering sheet (140) to lock an air gap; and disposing at least three ribs located on a second surface of the at least one guide rail pillar to connect the at least one guide rail pillar with a base ring and the external cylinder assembly (240), wherein the at least one guide rail pillar (110) comprises a guide bracket (157) to reduce the friction that enables smooth movement of the cabin (115).

* * * * *